(12) United States Patent
Ide et al.

(10) Patent No.: US 8,140,177 B2
(45) Date of Patent: Mar. 20, 2012

(54) NUMERICAL CONTROLLER WITH INTERFERENCE CHECK FUNCTION

(75) Inventors: Soichiro Ide, Yamanashi (JP); Yusaku Yamada, Yamanashi (JP); Osamu Hanaoka, Yamanashi (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 819 days.

(21) Appl. No.: 12/196,363

(22) Filed: Aug. 22, 2008

(65) Prior Publication Data

US 2009/0062955 A1 Mar. 5, 2009

(30) Foreign Application Priority Data

Aug. 28, 2007 (JP) .................................. 2007-221678

(51) Int. Cl.
*G06F 19/00* (2011.01)
*G06F 17/50* (2006.01)
*G05B 19/04* (2006.01)

(52) U.S. Cl. ............. 700/178; 700/177; 700/255; 703/1

(58) Field of Classification Search .......... 700/177–178, 700/255; 703/1
See application file for complete search history.

(56) References Cited

U.S. PATENT DOCUMENTS

| | | | | |
|---|---|---|---|---|
| 5,339,015 | A * | 8/1994 | Hanaki et al. | 318/600 |
| 6,452,604 | B1 * | 9/2002 | Sato | 345/619 |
| 6,754,555 | B2 * | 6/2004 | Yamato | 700/178 |
| 7,764,039 | B2 * | 7/2010 | Yamaguchi et al. | 318/569 |
| 2003/0225479 | A1 * | 12/2003 | Waled | 700/245 |
| 2004/0225405 | A1 * | 11/2004 | Takahashi et al. | 700/178 |
| 2006/0052901 | A1 * | 3/2006 | Nihei et al. | 700/245 |

FOREIGN PATENT DOCUMENTS

| | | |
|---|---|---|
| EP | 1 366 867 | 12/2003 |
| JP | 61-159350 | 7/1986 |
| JP | 05204428 A * | 8/1993 |
| JP | 9-230918 | 9/1997 |

\* cited by examiner

*Primary Examiner* — Albert DeCady
*Assistant Examiner* — Darrin Dunn
(74) *Attorney, Agent, or Firm* — Drinker Biddle & Reath LLP

(57) ABSTRACT

A numerical controller having an interference prevention function whereby calculation for preventing interference is reliably performed. The numerical controller has the function of defining interference regions corresponding to multiple machine structural objects, respectively, moving the interference regions in accordance with machine coordinate values of the machine structural objects updated by interpolation, and performing an interference check to determine whether or not the interference regions interfere with each other. Interference check computation period automatic adjusting means automatically adjusts an interference check computation period, based on the value obtained by dividing a computation time required for the interference check by time of occupancy of the interference check within one interpolation period. Interference region expanding means expands the interference regions, based on the highest of feed velocities of respective axes and the interference check computation period. Checking means determines whether or not the expanded interference regions interfere with each other.

6 Claims, 3 Drawing Sheets

NUMERICAL CONTROLLER WITH INTERFERENCE CHECK FUNCTION

RELATED APPLICATION DATA

This application claims priority under 35 U.S.C. §119 and/or §365 to Japanese Application No. 2007-221678, filed Aug. 28, 2007, the entire contents of which are incorporated herein by reference.

BACKGROUND OF THE INVENTION

1. Field of the Invention

The present invention relates to numerical controllers for controlling machine tools and the like, and more particularly to a numerical controller provided with the function of preventing mutual interference of movable parts of a machine tool and the like.

2. Description of Related Art

A numerical controller for controlling a machine tool controls the operation of movable parts (control axes) of the machine tool in accordance with an NC program created beforehand, to machine a workpiece to be machined.

While the workpiece is machined by the machine tool, the respective parts of the machine tool, such as a tool, tables, a workpiece-clamping jig and a spindle table, must not interfere with one another. To prevent such interference, interference check has conventionally been performed to determine whether or not the respective parts of the machine tool and the workpiece interfere with one another.

For example, a technique has been known in which each machine part that may possibly cause interference, such as a tool, is defined as an interference object by using a combination of solid bodies, and the created definition is stored in memory. A current position of the interference object is obtained, and the position of the interference object after movement of the axis is obtained by interpolating move commands. Then, a region in which the solid body constituting the interference object can cause interference during the movement of the interference object from the position before the interpolation to the position after the interpolation is calculated as an interference decision solid, and an interference decision region is set using a combination of such interference decision solids, to allow interference to be checked based on the set interference decision region (cf. JP 09-230918A).

In the above technique of checking interference on the basis of the interference decision region, the interference checking process is executed after the interpolation process is performed by the numerical controller. With this technique, however, if the interference checking process is prolonged due to increase in the number of objects of interference check (e.g., tools, tool holders, workpieces, jigs, and tables) and the number of solid bodies constituting the objects, the interpolation process of the numerical controller fails to be executed quickly and thus slows down, causing the interference checking process to be interrupted in the middle.

SUMMARY OF THE INVENTION

The present invention provides a numerical controller provided with an interference prevention function whereby collision of parts of a machine tool can be checked in advance. More particularly, the invention provides a numerical controller of which an interpolation process is not influenced by an increase in the amount of calculation for the interference check, thereby permitting the calculation for the interference check to be reliably performed.

A numerical controller of the present invention controls respective axes for moving a movable element and has a function of defining interference regions respective for a plurality of machine structural objects including the movable element, moving the interference regions based on machine coordinate values of the machine structural objects obtained by interpolation processing at every interpolation period, and checking whether or not the interference regions interfere with each other. The numerical controller comprises: interference check computation time calculating means that calculates computation time required for the interference check; interference check computation period automatic adjusting means that automatically adjusts an interference check computation period based on a value obtained by dividing the computation time required for the interference check by occupancy time preset for the interference check in one interpolation period; interference region expanding means that expands one or more of the interference regions based on a highest one of feed velocities of the respective axes and the interference check computation period; and checking means that checks whether or not the expanded interference regions interfere with each other.

The interference regions may be defined by solid figures, and the checking means may check the interference by determining whether or not the solid figures intersect with each other.

The solid figure may comprise a rectangular parallelepiped, a cylinder or a plate.

The computation time required for the interference check may be determined according to the number of combinations of the interference regions defined by the solid figures, and the number of solid figures defining the interference regions.

The interference region expanding means may expand one of the interference regions by a size corresponding to a product of the highest one of the feed velocities of the respective axes and the interference check computation period.

The numerical controller may further comprise storage means that stores a plurality of interference region data indicative of different sizes of one machine structural object, and the interference region data may be selectively used for the one machine structural object.

The numerical controller may further comprise means that further expands one or more of the interference regions expanded by the interference region expanding means, and means that determines whether or not the further expanded interference regions interfere with each other during a manual operation and decelerates motions of the respective axes when it is determined that the further expanded interference regions interfere with each other.

According to the present invention, interference is checked on the basis of machine coordinate values that are not yet subjected to acceleration/deceleration. It is therefore possible to reliably stop the axis movement before collision, without being influenced by the acceleration/deceleration. Also, in the present invention, the interference check computation period is automatically adjusted, and thus, if the amount of calculation for the interference check increases, the interpolation process of the numerical controller is not affected by such an increase in the amount of the calculation, whereby the calculation for the interference check can be reliably performed.

Also, the interference region expanding means makes it possible to reliably avoid interference even in cases where the interference check computation period varies. Further, where the function is added whereby the expanded interference regions are further expanded by a predetermined amount during manual operation, the operator can easily recognize the occurrence of interference. Moreover, when an interference region reaches a position short of another interference region by a specified distance, the corresponding axis may be decelerated, and this makes it possible to reliably avoid collision of the machine parts even during the manual operation.

DETAILED DESCRIPTION

Figure 1:
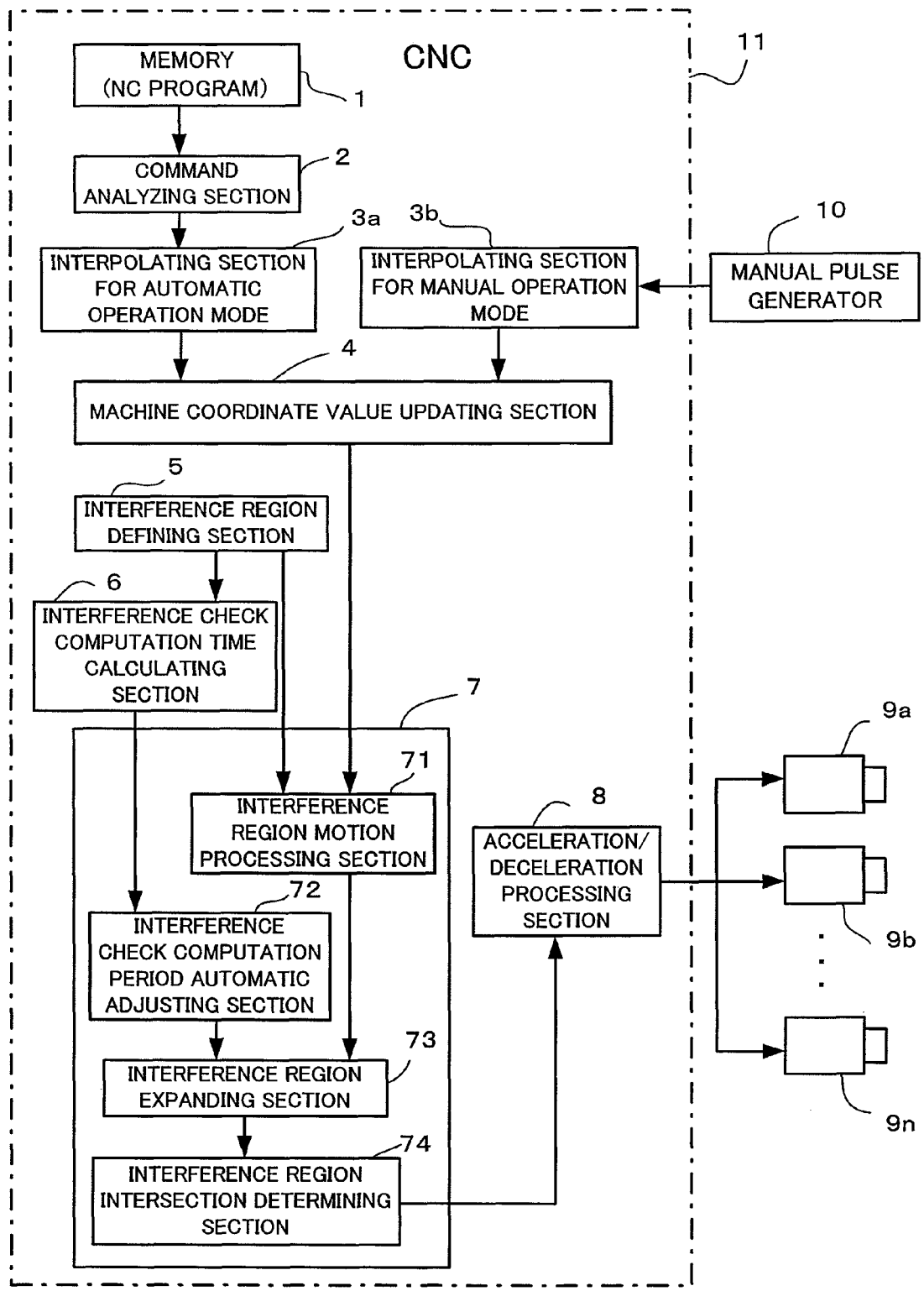
FIG. 1 is a schematic block diagram of a numerical controller according to an embodiment of the present invention.

FIG. 1 is a functional block diagram of a numerical controller 11 according to an embodiment of the present invention. A machining program input from outside is stored in a memory 1 of the numerical controller 11. A command analyzing section 2 successively reads out blocks of the NC program stored in the memory 1, then analyzes each read block, and converts the block into executable form, move and velocity commands obtained as a result being sent to an interpolating section 3a for automatic operation mode. The interpolating section 3a performs interpolation for respective axes in accordance with the move and velocity commands, and outputs interpolation pulses. To permit manual operation of a machine tool, an interpolating section 3b for manual operation mode performs interpolation for the respective axes in accordance with a signal input from a manual pulse generator 10 for jog feed, and outputs interpolation pulses. The interpolation pulses (from the interpolating section for automatic operation mode or the interpolating section for the manual operation mode) are supplied to an acceleration/deceleration processing section 8 to be accelerated or decelerated, and the resulting pulses are output to servo amplifiers, not shown in FIG. 1, associated with respective servomotors 9a to 9n. In accordance with the accelerated/decelerated interpolation pulses, the servo amplifiers drive the respective servomotors 9a to 9n.

A machine coordinate value updating section 4 updates machine coordinate values of control axes in accordance with the interpolation pulses supplied from the interpolating section 3a or the interpolating section 3b, and obtains machine coordinate positions of specified control axes.

The shapes of workpieces, jigs, tools, and the machine tool are set beforehand in an interference region defining section 5 as interference regions. The interference regions are defined by using solid figure such as rectangular parallelepipeds, cylinders, plates, etc. The shape of a machine part that may cause interference is defined using a combination of more than one solid figure as the case may be.

Also, to cope with an interference region corresponding to a workpiece whose shape varies during machining, a plurality of interference regions may be registered in advance so as to be switched according to conditions. Such conditions may be an instruction to change the region (e.g., G22.2) specified by an NC statement, currently assumed machine coordinate values (e.g., if X<0.0, region 1 is selected, and if X≧0.0, region 2 is selected), etc.

An interference check computation time calculating section 6 calculates a computation time required for an interference checking process. The computation time required for the interference check is determined by the number of combinations of solid figures used for the interference check, such as rectangular parallelepipeds, cylinders and plates, and the number of solid figures with respect to which interference is to be checked. The computation time needed for the interference checking process will be explained later.

An interference check section 7 includes, as its functions, an interference region motion processing section 71, an interference check computation period automatic adjusting section 72, an interference region expanding section 73, and an interference region intersection determining section 74. Based on the machine coordinate positions updated by the machine coordinate value updating section 4, the interference region motion processing section 71 moves the interference regions set by the interference region defining section 5. The interference check computation period automatic adjusting section 72 determines an interference check computation period based on the value (quotient) obtained by dividing the computation time required for the interference check, calculated by the interference check computation time calculating section 6, by the time of occupancy of the interference check within one interpolation period. Specifically, the interference check computation period is obtained by multiplying one interpolation period by the obtained quotient. Accordingly, as the computation time required for the interference check or the time of occupancy of the interference check within one interpolation period varies, the interference check computation period obtained by the interference check computation period automatic adjusting section 72 also varies.

The interference region expanding section 73 expands the interference regions defined in the interference region defining section 5 and moved by the interference region motion processing section 71, in accordance with the interference check computation period and the highest one of feed velocities of the respective axes. The expansion process will be explained later.

The interference region intersection determining section 74 performs a calculation for checking interference of the interference regions expanded by the interference region expanding section 73. Whether interference occurs or not is determined by confirming whether any of the sides and vertices of a solid figure, such as a rectangular parallelepiped, which forms the interference region corresponding to the shape of one machine part interferes with a solid figure, such as a rectangular parallelepiped, which forms the interference region corresponding to the shape of another machine part.

If it is judged by the interference region intersection determining section 74 that the interference regions do not interfere with each other, the interpolation pulses from the interpolating section 3a or the interpolating section 3b are output to the acceleration/deceleration processing section 8. The acceleration/deceleration processing section 8 outputs the interpolation pulses to servomotor controllers, not shown, for controlling the respective servomotors 9a, 9b, . . . , 9n as control axes 9. The servomotor controllers control the positions and velocities of the respective control axes 9 in accordance with position, velocity and current feedback signals, not shown, fed back from the servomotors 9a, 9b, . . . , 9n.

On the other hand, if it is judged by the interference region intersection determining section 74 that the interference regions interfere with each other, the intersection determining section 74 stops outputting, to the acceleration/deceleration processing section 8, the interpolation pulses supplied from the interpolating section 3a or the interpolating section 3b.

During the manual operation in which signals from the manual pulse generator 10 are inputted to the interpolating section 3b of the numerical controller 11, if an interference region reaches a position short of another interference region by a predetermined distance, the respective axes may be decelerated.

At the instant the occurrence of interference is judged by the interference check section 7, machine movable parts (control axes) driven by the servomotors 9a to 9n, such as a tool and tables, are still moving and cannot stop in a moment. Namely, the machine movable parts require a deceleration time to come to a full stop after a stop command is output.

The following explains the computation time required for the interference checking process, calculated by the interference check computation time calculating section 6. The computation time needed for the interference check processing is determined according to the number of combinations of the interference regions defined in the interference region defining section 5 by solid figures such as rectangular parallelepipeds, cylinders and plates, and the number of solid figures defining the interference regions. The combinations of solid figures include combinations (1) to (6) indicated below. The number of combinations represents the number of combinations such as tool*workpiece, tool*jig, tool*table, and tool*tool holder. Where the shape of a machine part that may cause interference is defined by a combination of more than one solid figure, for example, where a tool is constituted by a rectangular parallelepiped #1 and a cylinder #1 while a table is constituted by rectangular parallelepipeds #2 and #3, interference between the tool and the table needs to be checked with respect to four combinations (7) to (10) also indicated below.

The interference check computation time calculating section 6 weights respective calculation times, and calculates a total time corresponding to all of the combinations, to obtain the interference check computation time.

(1) rectangular parallelepiped*rectangular parallelepiped
(2) cube*cylinder
(3) rectangular parallelepiped*plate
(4) cylinder*cylinder
(5) cylinder*plate
(6) plate*plate
(7) rectangular parallelepiped #1*rectangular parallelepiped #2
(8) rectangular parallelepiped #1*rectangular parallelepiped #3
(9) cylinder #1*rectangular parallelepiped #2
(10) cylinder #1*rectangular parallelepiped #3

The interference check computation period automatic adjusting section 72 in the interference check section 7 divides the interference check computation time by the occupancy time of the interference checking process within one interpolation period, and multiplies the obtained quotient by the interpolation period and sets the obtained product as the interference check computation period.

The calculation for the interference check performed by the interference check section 7 will be now explained. In cases where all calculation steps for the interference check (computations by the interference region motion processing section 71, the interference check computation period automatic adjusting section 72, the interference region expanding section 73 and the interference region intersection determining section 74) performed by the interference check section 7 fail to be finished within one interpolation period and need to be performed over multiple interpolation periods, it is possible that interference (collision) has already occurred when the interference is detected.

In order to avoid such interference (collision), a margin width is automatically set with respect to the solid figures defined in the interference region defining section 5 as the interference regions. The margin width is obtained, for example, according to Equation (1) below. In cases where the number of combinations ((1) to (6)) of objects of interference check (tools, tool holders, workpieces, jigs, tables, etc.) as well as the number of solid figures contained in the objects are large, it takes time to complete all the calculation steps for the interference check. In the present invention, therefore, the interference check computation period is automatically adjusted in accordance with the number of combinations of the objects of interference check and the contents of the objects.

$$\text{Margin width } D = \frac{F*T}{60*1000} \quad (1)$$

where F: the highest one of rapid traverse velocities set for the respective axes (mm/min); and
T: interference check computation period (msec) (calculated automatically by CNC).

Figure 2:
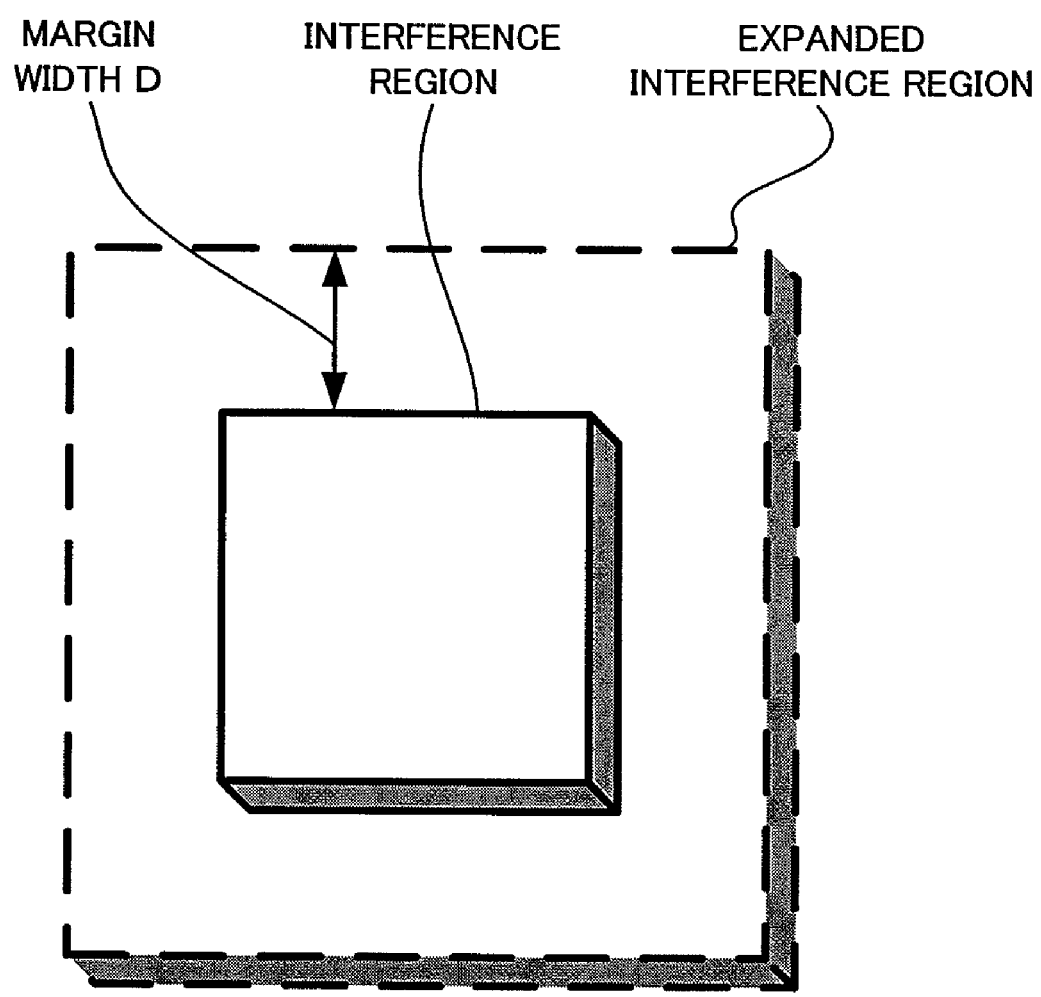
FIG. 2 is a schematic diagram illustrating an interference region and an expanded interference region.

FIG. 2 is a conceptual diagram illustrating the relation between a rectangular parallelepiped as an example of the interference region, and an expanded rectangular parallelepiped with a margin width D calculated according to Equation (1). Expansion of the interference region by the margin width D can be carried out by swelling the surfaces of a solid figure as the interference region in their normal directions by the margin width D. Computation for such expansion can be performed using conventional techniques such as matrix operation. It is also possible to use various image processing techniques to obtain the expanded interference region.

Even in the case where all of the calculation steps for the interference check can be completed within one interpolation period, movement of the interference regions is effected only once within one interpolation period. In this case, however, there is a possibility of overlooking a situation where the interference region interferes with another while moving to the next position (in other words, interference occurs during one interpolation period), that is, a situation where interference does not occur before or after movement but occurs during the movement. To avoid such a situation, each interference region is expanded further by an additional margin width corresponding to a motion amount in one interpolation period so that interference occurring in the process of movement within one interpolation period can also be prevented.

Figure 3:
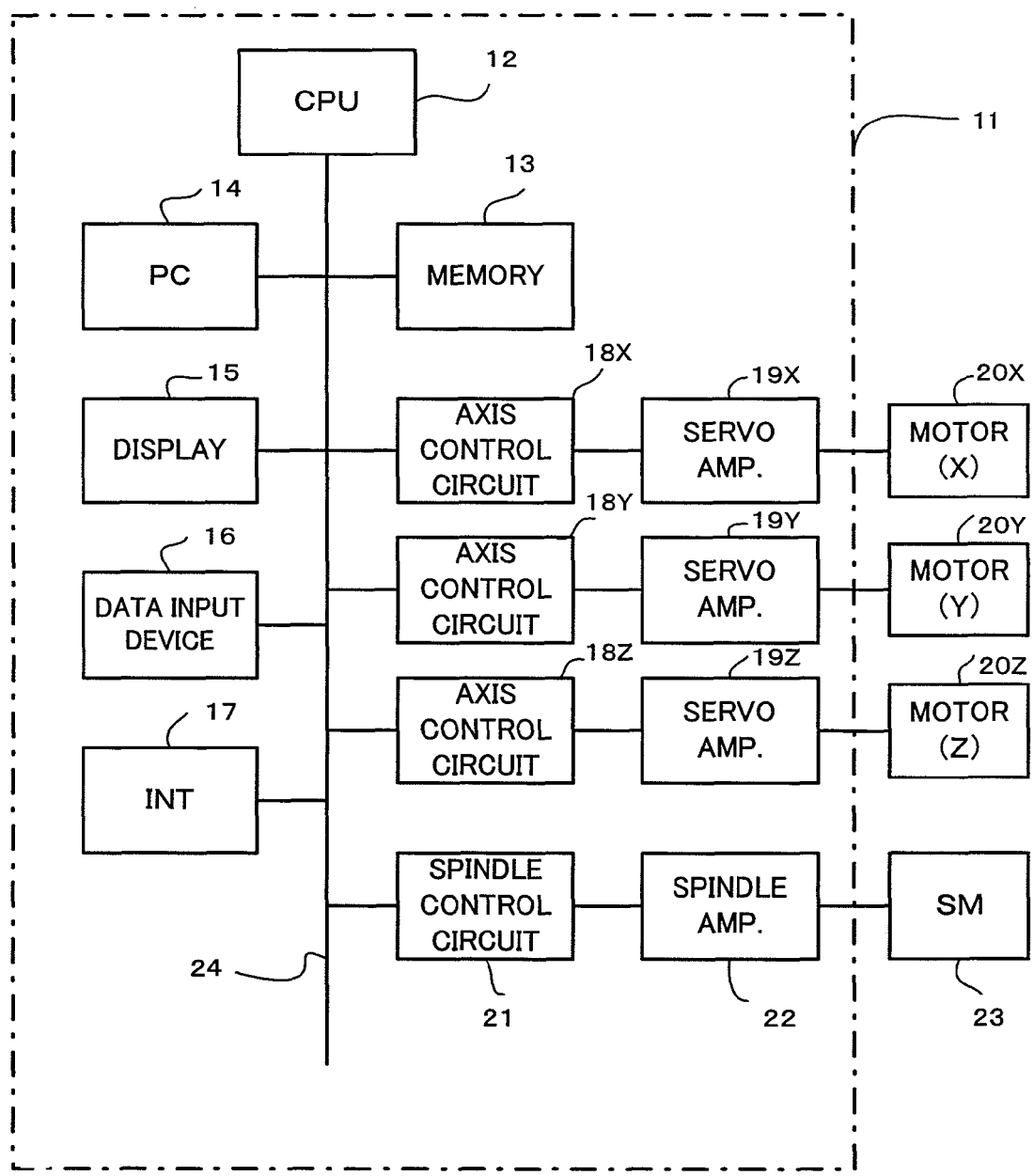
FIG. 3 shows the numerical controller with an interference prevention function according to the embodiment of the present invention.

FIG. 3 shows the numerical controller 11 with the interference prevention function according to the embodiment of the present invention. A CPU 12 is a processor for globally controlling the numerical controller 11. The CPU 12 is connected, via a bus 24, with a memory 13 constituted by ROM, RAM, nonvolatile RAM, CMOS and the like, a PC (programmable controller) 14, a display device 15 such as a CRT or liquid crystal display, a data input device 16 permitting entry of various commands and data, such as a keyboard, an interface 17 connected to an external storage medium, a host computer or the like, axis control circuits 18X, 18Y and 18Z associated with respective axes of a machine tool, and a spindle control circuit 21. The axis control circuits 18X, 18Y and 18Z control servomotors 20X, 20Y and 20Z through servo amplifiers 19X, 19Y and 19Z, respectively, and the spindle control circuit 21 controls a spindle motor 23 through a spindle amplifier 22.

In accordance with a sequence program internally stored in the numerical controller 11, the PC 14 controls a working machine as the machine tool by outputting/receiving signals to/from auxiliary devices of the working machine. Also, the PC 14 receives signals from various switches and the like of an operator's panel mounted on the body of the machine tool controlled by the numerical controller, then performs necessary processes on the received signals, and sends the processed signals to the CPU 12.

The CPU 12 loads, through the bus 24, a system program stored in the ROM of the memory 13, and globally controls the numerical controller 11 in accordance with the system program. In connection with the present invention, the memory 13 stores software for executing an algorithm for the aforementioned interference checking process, as well as data defining the shapes of respective machine parts that may possibly cause interference, as polyhedrons or combinations thereof (in this embodiment, rectangular parallelepipeds, cylinders, and plates).

Also, in the above embodiment of the present invention, the interference checking process is executed by the numerical controller 11. Alternatively, the interference check may be performed by an information processing device provided independently of the numerical controller 11, such as a personal computer. In this case, the system is configured such that the machine coordinate values (positions) of the control axes, updated by the machine coordinate value updating section 4, are transmitted to the information processing device, which then performs the interference checking process and sends the results of the process to the numerical controller 11.

Further, in the foregoing description of the embodiment, the invention is applied to a numerical controller for controlling a machine tool, by way of example. The present invention can equally be applied to numerical controllers for controlling machines such as robots and industrial machines whose movable parts (control axes) may interfere with each other during movement thereof.

What is claimed is:

1. A numerical controller which has functions of defining interference regions corresponding to multiple machine structural objects, respectively, moving the interference regions in accordance with machine coordinate values of the machine structural objects updated by interpolation, and performing an interference check to determine whether or not the interference regions interfere with each other, said numerical controller comprising:

interference check computation period automatic adjusting means for automatically adjusting an interference check computation period by dividing a computation time required for the interference check by an occupancy time for the interference check within one interpolation period and then multiplying a result by the interpolation period;

interference region expanding means for expanding the interference regions, based on a highest of feed velocities of respective axes and the interference check computation period; and checking means for determining whether or not the expanded interference regions interfere with each other.

2. The numerical controller according to claim 1, wherein the interference regions are defined by solid figures of a rectangular parallelepiped and a cylinder and a plane, and said checking means checks the interference by determining whether or not the defined solid figures and plane intersect with one another.

3. The numerical controller according to claim 2, wherein the computation time required for the interference check is determined according to a number of combinations of the defined solid figures of rectangular parallelepiped and cylinder and planes for the interference check and the number of the defined solid figures of rectangular parallelepiped and cylinders and planes with respect to which interference is to be checked.

4. The numerical controller according to claim 1, wherein a size of the interference region expanded by the interference region expanding means is determined by multiplying the highest velocity of feed velocities of respective axes by the interference check computation period.

5. The numerical controller according to claim 1, further comprising storage means for storing data on a plurality of interference region of different sizes for one machine structural object, wherein the stored data on interference region are switched according to a predetermined condition.

6. The numerical controller according to claim 1, wherein the interference check is performed, during manual operation, for an interference region formed by further expanding, by a predetermined amount, an interference region expanded by the interference region expanding means, and if determined that interference occurs, then motions of respective axes are decelerated.

\* \* \* \* \*